March 11, 1969 F. W. MEISEL, JR 3,431,911
ABSORBENT PAD
Filed June 17, 1966

INVENTOR.
FRED W. MEISEL, JR.
BY
*Stanton T. Hadley*
ATTORNEY.

3,431,911
ABSORBENT PAD
Fred W. Meisel, Jr., Media, Pa., assignor to Scott Paper Company, Philadelphia, Pa., a corporation of Pennsylvania
Filed June 17, 1966, Ser. No. 558,442
U.S. Cl. 128—287    11 Claims
Int. Cl. A61f *13/18;* B32b *3/24, 3/26*

ABSTRACT OF THE DISCLOSURE

An absorbent pad having a facing layer of soft, flexible, open-celled polymeric foam material, reticulated in some embodiments, which layer covers an underlying layer of fluid absorbent material in the pad.

---

The present invention relates generally to absorbent pads and, more particularly, to an improved composite absorbent pad laminate and composite absorbent pad of the disposable type.

Absorbent pads of a disposable type which can be discarded after a single use have been more widely utilized than in the past. They are replacing the absorbent pads of the washable, re-usable, woven cloth type employed in prior years. This is particularly true in the area of diapers or diapering garments, in general, including those of the type used by infants as well as those required for use by incontinent adults. However, it is also realized that it is advantageous to use absorbent pads of a disposable type in many other areas such as in catomenial appliances and surgical bandages. Another area of high volume pad use is in the hopsital in connection with operating room procedures as well as in patient care areas where stringent requirements of cleanliness and sanitation make the use of a disposable pad highly desirable. It is a new and novel absorbent pad structure and absorbent laminate useful in the types of pads described above to which the present invention is related and directed.

It is a main objective of the present invention to provide a new and improved absorbent pad which can be produced for a cost which permits it to be discarded after a single use.

It is an additional object of the present invention to provide a disposable absorbent pad of light weight and small bulk which has excellent absorbency characteristics.

It is a still further object of the present invention to provide a new type of single use disposable pad such as a diaper or incontinent pad which is soft and comforting and possesses breathability in the surface adjacent the wearer.

It is a further object of the present invention to provide a new structure for an incontinent pad advantageously adapted for use by bedridden patients.

The absorbent pad of the invention comprises a top layer of soft, flexible, open-celled polymeric foam material which is fluid permeable, an underlying layer of fluid absorbent material, and a bottom layer of flexible, moisture-impervious material. In some embodiments, the polymeric foam material is polyurethane foam of either the open-celled or the reticulated type. One embodiment of the pad of the invention is a structure where the top layer has overlapping margins on at least two opposed edges thereof which extend around the side edges of said underlying layer and said bottom layer. These margins are adhered to the lower surface of said bottom layer. Where this pad structure is used as an incontinent pad for bedridden patients, the underturned foam margins provide gripping means for impeding slippage of the pad over a supporting surface or substrate.

Additional objects and advantages of the invention will become apparent from the following detailed description thereof.

Figure 1:
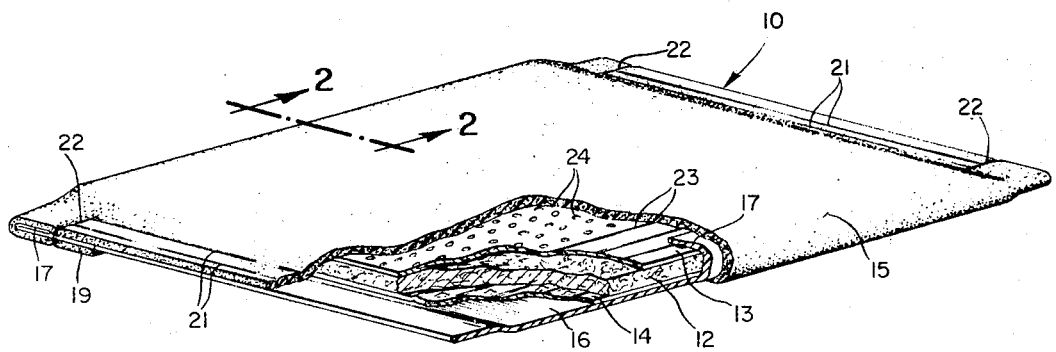
Figure 2:
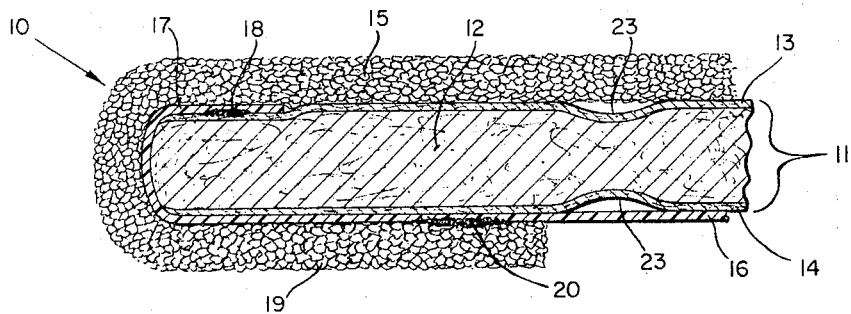
Figure 3:
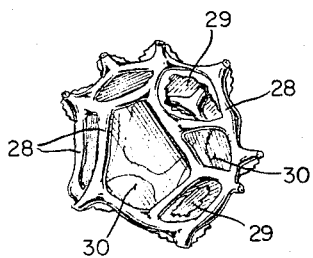
Figure 4:
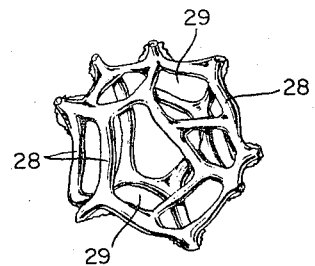

FIGURE 1 is a perspective view of an absorbent pad of the invention showing parts in section and illustrating the manner of its construction, FIGURE 2 is a greatly enlarged sectional view taken along line 2—2 of FIGURE 1, FIGURE 3 is a greatly enlarged view of a single cell of open-celled polyurethane foam, and FIGURE 4 is a greatly enlarged view of a single cell of reticulated polyurethane.

Referring now to the drawing, and specifically to FIGURES 1 and 2 thereof, a specific embodiment of an absorbent pad of the invention is shown in the form of an incontinent pad. A similar structure could be employed, for example, as a diapering article for infants. It should be clearly understood that pads of the invention can be formed in a wide variety of sizes, largely depending upon their end use.

The incontinent pad 10 has an absorbent section 11 formed from a layer 12 of fluffed wood pulp disposed between two spaced sheets 13 and 14 of creped wadding. The pad 10 also includes a fluid permeable layer 15, which is disposed on top of the sheet 13 and which generally overlies the absorbent section 11, and a moisture impermeable backing layer 16 which is disposed generally beneath the absorbent section and underlies the sheet 14.

The fluid permeable layer 15 comprises a layer of open-celled polymeric foam material. Thus, some of the cell walls of adjoining cells are broken, allowing the movement of fluids therethrough. In some embodiments, reticulated polymeric foam materials are employed. In these instances, substantially all of the cell walls are removed, leaving a 3-dimensional skeletal structure of polymeric material. The pore size of these polymeric foams is preferably between about 60 and 120 pores per inch.

Two opposed side edges of moisture impervious layer 16 extend beyond the corresponding side edges of the absorbent section 11 and form flaps 17 which are folded around the upper surface of the sheet 13 and secured thereto as by adhesive. In a similar manner, two opposed side edges of fluid permeable layer 15 extend beyond the corresponding side edges of the absorbent section 11 and form flaps 19 which are folded around the side edges of section 11 and layer 16 and secured to the lower surface of the bottom moisture impervious layer 16. These flaps 19 are bonded to the layer 16 by a line of adhesive 18 in the embodiment shown. Other means of attachment would also be satisfactory. This construction prevents loss of fluffed wood pulp 12 out the sides of absorbent section 11 from between sheets 13 and 14. A similar manner of construction might be employed on the ends of pad 10.

In the embodiment shown, the layers of the pad 10 are secured together at the ends thereof in the following manner. The sheets 13 and 14 and the enclosed layer 12 terminate at each end at a point inwardly spaced from the ends of fluid permeable layer 15 and moisture impermeable layer 16. The layers 15 and 16 are secured together in one or more spaced lines 21 parallel to their end edges, as by heat sealing or adhesive. As shown in FIGURE 1, these lines 21 terminate short of the side edges of pad 10 in further points of securement labeled 22.

The above-described construction is convenient to manufacture on high speed equipment, which is a necessary feature for a disposable pad. It effectively prevents the loss of fluffed wood pulp or other material from the absorbent section 11.

Other embodiments of the pad of the invention have corresponding layers of fluid permeable material, absorbent material and moisture impervious material arranged so that the absorbent section is smaller in surface area than the other two layers. When assembled, the marginal areas of the fluid permeable layer extending beyond the peripheral edges of the absorbent layer are secured to the marginal areas of the moisture impervious layer similarly extending beyond the peripheral edges of the absorbent layer. Such securement is conveniently effected by adhesive, heat sealing, or stitching.

The fluffed wood pulp or other absorbent material employed in conventional absorbent pads often has a tendency to shift about and to become unevenly distributed when the pad is transported. This tendency is reduced or eliminated in the pad of the invention by embossing the layers in the absorbent section 11, that is, layer 12 between sheets 13 and 14. The nature of one type of embossing found to be satisfactory for this purpose is shown in FIGURE 1. The composite absorbent section 11 is embossed in spaced lines 23 extending longitudinally of the pad from one end to the other. Several closely spaced lines 23 are employed near the edges of the pad 10. The areas intermediate the lines 23 are embossed in a pattern of spots 24 or spaced areas. These lines 23 and spots 24 form areas where the fluffed wood pulp is compacted and the sheets 13 and 14 are locally forced into the layer 12 thereby assisting in preventing slippage between the layers in the absorbent section of the pad and generally stabilizing the material in layer 12.

Absorbent section 11 may comprise one or more layers of any suitable absorbent material or combination thereof. For example, it might be formed from a plurality of layers of creped tissue paper or from fluffed wood pulp of any suitable species. The volume of absorbent material in the pad will vary depending upon the intended use of the pad. The absorbent layer or section 11 is normally the major portion of the pad thickness. Similarly, the moisture impermeable backing layer 16 can be formed from any one of a variety of materials, such as sized paper, rubber, plastic, etc. Polyethylene film having a thickness of from 1 to about 1¼ mils has been found satisfactory for this purpose.

The fluid permeable layer 15 is formed from an open-celled polymeric foam material, which material might be any one of a number of plastic foams. Several foams found to be satisfactory are the polyether or polyester polyurethane foams. However, any open-celled foam material having the requisite porosity, softness, flexibility, and, preferably, resiliency would be satisfactory.

When employed as an incontinent pad for bedridden patients, the absorbent pad of the invention serves several purposes. It provides a means for absorbing body fluids and for cushioning the patient in a supported position. A resilient surface in contact with the patient has been found to soothe and aid the healing of bed sores, and to reduce the likelihood of their formation.

The nature of the foam layer 15 of the laminate 10 is best illustrated in FIGURES 3 and 4 which are greatly enlarged views of single cells from typical cellular polyurethane foam material. Each cell is a 3-dimensional network of interconnected strands 28 which form junctions between the faces or walls of the cells of the foam body. Most so-called "open-celled" polyurethane foam, of which the cell shown in FIGURE 3 is typical, possesses thin membrane-like sheets of material across at least certain or some of the cell faces as indicated by reference numeral 30 in FIGURE 3. Other cell faces, as indicated by reference numeral 29 are open by virtue of the membraneous material at the face having been broken during the foaming operation.

A polyurethane resin or polymer is formed by the reaction of a diisocyanate with a polyhydroxy material. Generally, these resins are classed as, e.g., polyether or polyester polyurethanes, depending on the chemical nature of their polymeric units. There are other, less commonly used, types classified as to the nature of the polymer with which the isocyanate is reacted. A polyurethane foam is produced by generating $CO_2$, e.g., by reaction of water with an isocyanate, or other gas in the reaction mixture, e.g., by a vaporization of a volatile liquid by the heat of reaction, while converting a liquid form of the polymer to a solid form of the polymer, e.g., by cross-linking or otherwise increasing the molecular weight of the liquid polymer.

In the preparation of foamed polymeric cellular structures, a gas or vapor is generated while the material to be foamed is in the plastic state. The generation of this gas results in the formation of bubbles, approximately spherical in form. As the bubbles expand, cells are formed which have more or less definite geometric configurations. The optimum packing for spheres is an arrangement in which each sphere is surrounded by 12 other spheres; and correspondingly, it has been found that the cells formed by the expansion of gas bubbles to the point of contact, so as to produce low-density, open-cell cellular structures, generally are in the form of dodecahedrons, with pentagonal sides or faces. This is the general rule, though in any foamed mass will be found cells of varying geometry. At the intersection of the faces are heavier strands of material. Between the strands forming the cell faces or walls are very thin membrane-like films.

Although several methods of foam reticulation are known, these foams can be satisfactorily reticulated by a process described in U.S. Patent 3,171,820 to Volz to form an open-celled polyester polyurethane foam of the type contemplated for use as the fluid permeable layer 15 in a specific embodiment of the composite assembly. This reticulation process removes substantially all of the remaining membranes 30, shown in FIGURE 3 and forming the cell faces or walls, and results in the formation of a plurality of skeletally outlined cage-like cavities. An example of a typical cell comprising the foam layer 15 after reticulation is illustrated in greatly expanded view in FIGURE 4. As is well-known, in a foam of this type, there is no plane surface but rather a series of cavities or cages formed by the strands 28.

One or more of the above layers of the absorbent pad of the invention may, in certain embodiments, be treated advantageously with a bacteriostat or substance which inhibits the growth of bacteria without destroying them. This substance may be applied to the upper surface of bottom layer 16 or to the absorbent section 11 or to the moisture pervious layer 15.

The function of the fluid permeable layer 15 is to support the patient on a resilient, porous breathable surface while permitting the free passage of fluids therethrough into the absorbent section 11. It has been found that the passage of fluids through the layer 15 is promoted significantly by treating the open-celled polymeric foam comprising layer 15 to make it more hydrophilic. When initially formed, these foams are slightly hydrophobic. Obviously, however, if the pore size of the foams is sufficiently large, the fluids will pass through the foam regardless of its surface characteristics. It has been found that by making the foam layer hydrophilic and by backing it with an absorbent section, the absorbent pad much more readily absorbs moisture through the fluid permeable layer into the absorbent section 11.

One method for such treatment involves spraying a solution of 10% Aerosol OT directly onto the porous foam structure. The solution may also be applied in a more thorough manner by dipping the foam into the solution and squeezing it to remove undesirable excess. An amount of 5% by weight of 100% Aerosol OT based on the weight of the foam sheet has been found to permit rapid passage of moisture through the sheet. The excess water may be removed by air drying of the foam at ambient or at an elevated temperature.

Aerosol OT is sodium dioctyl sulfosuccinate and is manufactured by American Cyanamide of Stamford, Connecticut. Other types of commercially available compounds can also be employed to increase the hydrophilicity of the polymeric foam, which compounds are well-known.

The structure shown in FIGURES 1 and 2 is particularly advantageous from several standpoints, especially when used as an incontinent pad for bedridden patients. Normally bedridden patients who are incontinent are disposed upon a moisture impermeable sheet of material such as vinyl or other plastic or rubber. If a pad is then positioned beneath the buttocks or midsection of the patient, it has a tendency to slip out of position due to minimal friction created between the moisture impermeable sheets of the pads and the moisture impermeable sheets upon the bed.

Absorbent pads of the present invention reduce or eliminate this problem when similarly employed. Thus, by employing a pad having flap 19 of open-celled polymeric foam material, gripping means are provided beneath the pad between portions of the surface of bottom layer 16 and the surface of the supporting substrate. Even greater frictional characteristics are created with the use of reticulated polymeric foams. In the specific pad shown, the flaps 19 extend only along the sides of the pad structure and provide adequate friction. Obviously, however, foam could also be employed over other areas of the pad and even across the entire bottom surface thereof.

The use of open-celled polymeric foam has a further advantage in connection with absorbent pads of providing a breathable surface in contact with a supported patient. This porous breathable surface has sufficient thickness to separate the patient from the absorbent layer or section 11. Although slightly compressible, it is sufficiently resilient to maintain this spacing or separation. It prevents or tends to prevent diaper rash and other skin afflictions which often accompany the use of diapers since air is allowed to contact the skin and keep it dry. This allows the patient to be more comfortable while using a single disposable pad for a longer period of time. Thus, the invention affords an additional saving in reducing the total number of pads used over a given period of time.

From the above, it can be seen that a number of alternative forms of the pad of the present invention are possible in addition to those specific embodiments described. It will be obvious to those skilled in this art that many variations and modifications can be made in the details set forth, without departing from the spirit of this invention or the scope of the claims which follow.

What I claim is:

1. An absorbent pad comprising a top layer of soft, flexible, open-celled polymeric foam material which is fluid permeable, an underlying layer of fluid absorbent material, and a bottom layer of flexible moisture-impervious material, said top layer having overlapping margins on at least two opposed edges thereof which extend around the side edges of said underlying layer and said bottom layer, said margins being adhered to the lower surface of said bottom layer, thereby providing gripping means for impeding slippage of said pad over a supporting substrate.

2. An absorbent pad according to claim 1, wherein said top layer comprises a sheet of open-celled polyurethane foam.

3. An absorbent pad according to claim 1, wherein said top layer comprises a sheet of reticulated polyurethane foam.

4. An absorbent pad according to claim 1, wherein said polymeric foam material has a coating on at least portions thereof, rendering it more hydrophilic than virgin foam material.

5. An absorbent pad according to claim 1, wherein at least one of said layers contains a bacteriostat.

6. An absorbent pad according to claim 1, wherein said fluid absorbent material comprises crepe wadding.

7. An absorbent pad according to claim 1, wherein said fluid absorbent material comprises fluffed wood pulp.

8. An absorbent pad according to claim 1, wherein said fluid absorbent material comprises a combination of crepe wadding and fluffed wood pulp.

9. An absorbent pad according to claim 1 wherein said polymeric foam material has a coating on at least portions thereof rendering it more hydrophilic than virgin foam material, said underlying layer comprises a composite structure of crepe wadding and fluffed wood pulp, said bottom layer comprises a sheet of flexible, fluid-impervious polymeric film material, and said overlapping margins are adhered to the lower surface of said bottom layer, thereby providing gripping means for impeding slippage of said pad over a supporting substrate.

10. An absorbent pad according to claim 9, wherein said polymeric foam material is open-celled polyurethane foam.

11. An absorbent pad according to claim 9, wherein said polymeric foam material is reticulated polyurethane foam.

References Cited

UNITED STATES PATENTS

| | | | |
|---|---|---|---|
| 2,649,858 | 8/1953 | Le Bolt | 128—284 |
| 3,067,747 | 12/1962 | Wolterding et al. | 128—296 |
| 3,070,096 | 12/1962 | Weitzman | 128—287 |
| 3,072,123 | 1/1963 | Davis | 128—287 |
| 3,113,568 | 12/1963 | Robins | 128—156 |
| 3,156,242 | 11/1964 | Crowe | 128—156 |
| 3,157,178 | 11/1964 | Bentov | 128—296 |

CHARLES F. ROSENBAUM, Primary Examiner.

U.S. Cl. X.R.

156—216; 161—160